United States Patent [19]
Sundt

[11] 3,941,700
[45] Mar. 2, 1976

[54] APPARATUS FOR MAGNETIC TREATMENT OF A FLOWING LIQUID

[75] Inventor: Eilert Sundt, Sandefjord, Norway

[73] Assignee: Olaf Fjeldsend A/S, Haugesund, Norway

[22] Filed: July 9, 1974

[21] Appl. No.: 486,848

[30] Foreign Application Priority Data
July 10, 1973 Norway............................ 2827/73

[52] U.S. Cl.................................. 210/223; 209/224
[51] Int. Cl.².......................................... B01D 35/06
[58] Field of Search ............ 210/222, 223; 209/222, 209/223, 215, 228, 229, 230, 217, 224

[56] References Cited
UNITED STATES PATENTS

| | | | |
|---|---|---|---|
| 2,464,628 | 3/1949 | Willard | 210/222 |
| 2,635,754 | 4/1953 | Stem | 210/223 |
| 2,648,438 | 8/1953 | Cox | 210/223 |
| 2,732,943 | 1/1956 | Hagberg | 210/223 |
| 2,830,705 | 4/1958 | Johanneson | 210/222 |

FOREIGN PATENTS OR APPLICATIONS

| | | | |
|---|---|---|---|
| 1,126,782 | 11/1956 | France | 210/223 |
| 1,022,864 | 3/1953 | France | 210/222 |
| 517,069 | 10/1955 | Canada | 210/223 |

Primary Examiner—Theodore A. Granger
Attorney, Agent, or Firm—Watson, Cole, Grindle & Watson

[57] ABSTRACT

An apparatus for magnetic treatment of a flowing liquid, such as water for the purpose of preventing precipitation of dissolved substances and corrosive effect of the liquid on the conduits and service apparatus contacted by the liquid.

7 Claims, 3 Drawing Figures

APPARATUS FOR MAGNETIC TREATMENT OF A FLOWING LIQUID

The present invention relates to an apparatus for magnetic treatment of a flowing liquid, such as water for the purpose of preventing precipitation of dissolved substances and corrosive effect of the liquid on the conduits and service apparatus contacted by the liquid.

Such magnetic treatment of liquids and various apparatus for effecting the treatment are previously known and are of particular interest in relation to water of the type which is apt to cause scale-like, calciferous deposits or corrosion.

The apparatus according to the invention is of the type which comprises a flow through housing which is made, at least in part, of a ferro-magnetic material, and at least one permanent magnet provided with pole shoes so mounted in the housing that one pole shoe is in magnetically conducting connection with the housing and the other defines a gap against the housing. The characteristic feature of the apparatus consists i.a. in that the permanent magnet is formed like an annular cylinder having disc shaped pole shoes and is mounted in a cup-shaped part of the apparatus housing with the liquid inlet and outlet connected to the interior cylindrical space of the magnet and the space between the magnet and the wall of the cup-shaped part, respectively, or vice versa. With such an arrangement of the apparatus it is possible, relatively small dimensions of the apparatus to obtain a flow section in the annular gap and a magnetic field strength in the same which will provide a very efficient treatment of the liquid. Due to the fact that the active parts of the apparatus are situated in a cup-shaped part which may be positioned laterally to the axis of the flow conduit of the liquid, it is easy to insert the apparatus into such a conduit and it will occupy a very small space.

Due to the fact that the liquid when flowing into the apparatus is directed axially through the cylindrical cavity of the annular-cylindrical cavity of the annular-cylindrical magnet, the liquid will, while passing through the magnet be subjected to the magnetic leakage flux prevailing between the poles of the magnet in the cylindrical cavity. Consequently, particles of ferromagnetic material which might be contained in the liquid will be subjected to a magnetic flux in the flow direction of the liquid, before arriving at the place of the main treatment of the apparatus, namely the annular gap. Through this influence, particles of ferromagnetic materials will be separated out and may be accumulated on the interior wall of the magnet or on filters and thereby prevented from fouling the boundary surfaces of the magnet gap proper, to the effect that this is kept clean. This influence may be advanced by so shaping the magnet that the length of the annular cylinder is small relative to the exterior ring diameter, as the leakage flux within the hollow cylinder may then adopt a considerable value.

An amplification of this leakage flux and an easier collection may be obtained if a member of ferromagnetic material extending axially towards the inlet be arranged in the cavity of the annular-cylindrical magnet and in magnetically conducting connection with the same near the outlet from the cavity. This member will then form a secondary magnetic pole against the magnet pole situated at the inlet, so that the leakage flux in the cavity will have a radial component and thereby more surely be effective all over the flow section.

For the collection of solid particles born by the liquid flow or separated out by the longitudinal magnetic effect, it is convenient to so mount the apparatus according to the invention that the axis of the annular cylindrical magnet will adopt a vertical position. The bottom of the cup-shaped part which contains the magnet is formed by a removable cap with an inserted sieve so that the solid particles carried by the liquid are retained on the sieve when the liquid passes the same on its way towards the place of the main treatment.

The sieve may also be formed by a cylinder which is inserted in the cavity of the magnet and covers the outlet from the same. Such a sieve will also collect the ferromagnetic particles which have been magnetically influenced in the cavity.

The passing of the liquid from the inner cavity of the magnet to the outside of the latter may also be obtained by supporting the magnet at an axial distance from the bottom of the cup-shaped casing, so that the liquid may flow around the lower edge of the magnet. However, it is also possible to provide the annular cylindrical magnet with passage openings near the outlet and, from the inner cavity to the space around the magnet. In this last embodiment the supporting of the magnet is simpler than in the first embodiment, and the axial height of the apparatus may be reduced.

The accompanying drawings illustrate how an apparatus according to the invention, by way of example, may be shaped.

Figure 1:
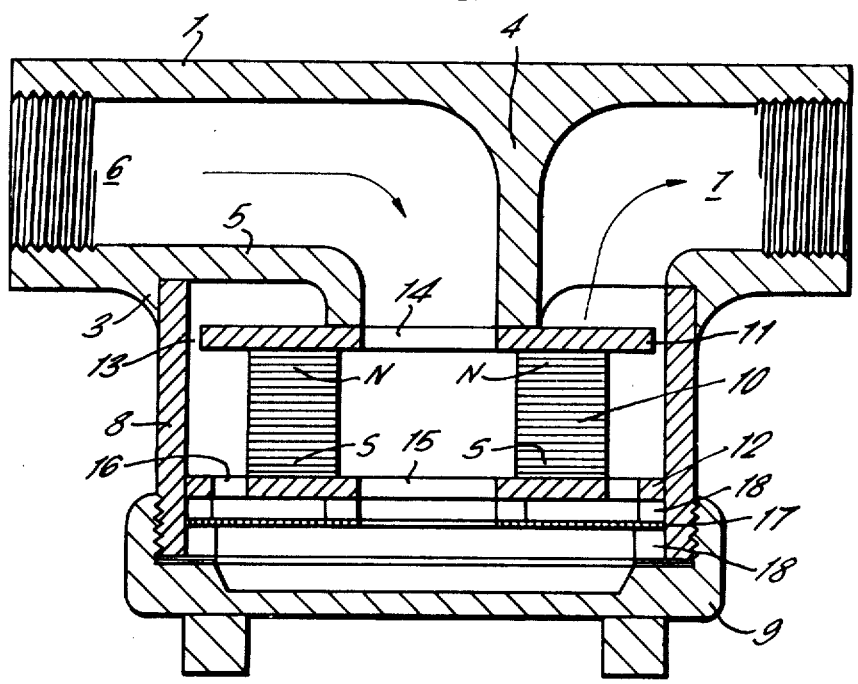
FIG. 1 is a vertical sectional view along the axis of the conduit in which the liquid is directed.

In the drawing, 1 is a pipe nipple which may be inserted in a pipe conveying a liquid in the direction of the two arrows. This nipple is provided with a circular flange 2 having an interiorly threaded lip 3, and with guide walls 4 and 5 guiding the liquid through the apparatus from the inlet 6 to the outlet 7. The nipple 1 is made of a non-ferromagnetic material, such as brass, aluminium or plastic.

Figure 2:
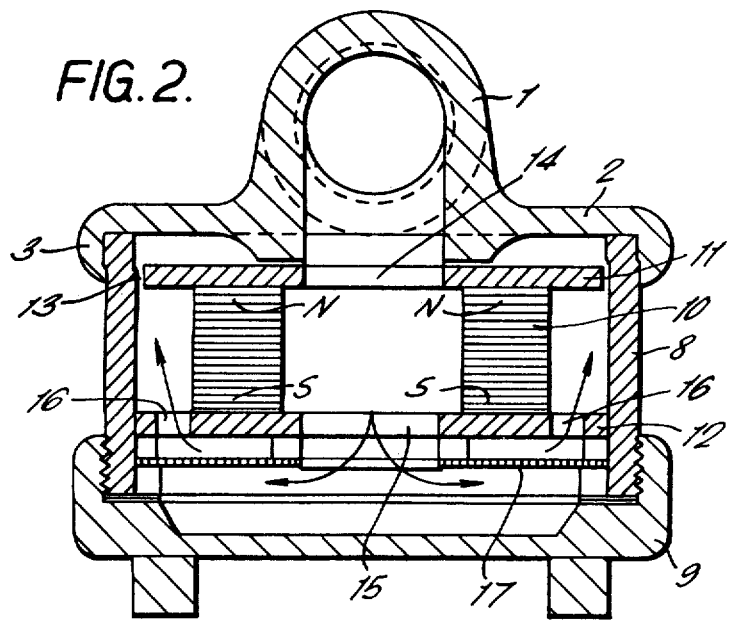
FIG. 2 is a vertical sectional view as seen in a direction at right angles to the conduit direction, along the line II—II in FIG. 1.

As shown in FIGS. 1 and 2, a tubular member 8 made of a ferromagnetic material is threaded into the lip 3 and closed at its free end by a threaded cap 9 made of non-ferro-magnetic material, such as brass, aluminium or plastic. An annular cylindric permanent magnet 10 is arranged within the tubular member 8 and with the south pole S, provided with an annular pole shoe 12, the circumference of which is in magnetically conducting connection with the tubular member 8. At the top end is the north pole N, with an equally annular pole shoe 11 of a diameter which is slightly smaller than the interior diameter of the tube 8, to the effect that an annular gap is formed between the circumference of the pole shoe 11 and the interior wall of the tube 8. Consequently, the tube 8 will constitute a magnetic continuation of the pole shoe 12, to the effect that the magnetic circuit of the magnet 10 will extend from the south pole S, through the pole shoe 12, the tube 8, and the gap 13 to the north pole N. Consequently, a magnetic flux will prevail in the gap 13, the flux lines extending from the tube 8 towards the circumference of the pole shoe 11, at right angles to a liquid flow through the gap. According to the axial length of the magnet 10, a magnetic leakage flux will also, secondarily, prevail directly between the south and north poles of the magnet through the interior cavity of the magnet 10.

The pole shoes 11 and 12 are provided with a central opening 14 and 15, respectively, both of a diameter substantially corresponding to that of the cavity of the magnet 10, and additionally, the pole shoe 12 is provided with holes 16 having a total sectional area corresponding to that of the openings 14 and 15.

The guide walls 4 and 5 in the nipple 1 are so shaped that liquid which is introduced through the inlet 6, will pass through the opening 15 in the pole shoe 12, into the cap 9, through the holes 16, through the space between the exterior wall of the magnet 10 and the interior wall of the tube 8, and through the gap 13 to the outlet 7.

A sieve 17 is mounted in the cavity of the cap 9, in the flow path between the opening 15 and the holes 16, the sieve being kept in position between the pole shoe 12 and the cap 9 by means of rings 18 made of non-ferromagnetic material, preferably plastic.

When a liquid is passed through the inlet 6 into the cavity in the magnet 10, it is subjected to the influence of the leakage flux between the south and north poles of the magnet, with strength lines extending axially against the direction of flow of the liquid. Through the influence of these strength lines, particles of ferro-magnetic substances which are carried along with the liquid are separated out and retained on the inner wall of the magnet, whereas other particles are collected on the sieve 17. When the liquid is passed on through the gap 13, it is subjected to a magnetic flux, the strength lines of which are extending at right angles to the direction of flow, to the effect that substances in the liquid which might give rise to deposits or corrosion in conduits or apparatus further on in the direction of flow of the liquid are neutralized in a manner known per se.

Figure 3:
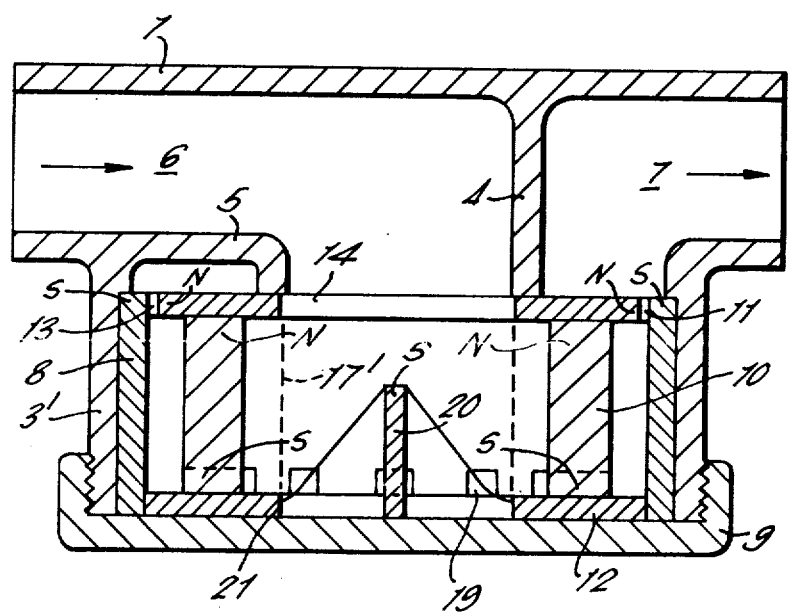
FIG. 3 is a sectional view similar to that of FIG. 1, in a second embodiment of the apparatus.

FIG. 3 illustrates a slightly modified embodiment of the apparatus. The manner of operation is, however, the same as explained above, only the structural details are modified.

Thus, the lips 3 of FIGS. 1 and 2 are here made in the form of a sleeve like projection 3' interiorly receiving the ferro-magnetic member 8 and carrying the cap 9 at the lower end.

An axial sieve 17' is arranged in the inner cavity of the magnet 10. The sieve 17' is of the same diameter as the inlet opening 14 and extends downwardly right on to the top side of the cap 9. In this embodiment, the magnet 10 with its pole shoes 11 and 12 and the exterior member 8 are supported directly by the cap 9, the flow passage of the liquid from the cavity inside of the magnet to the space around the same being formed by recesses 19 in the lower edge of the magnet 10. Hereby, the assembly of the apparatus is highly facilitated, as i.a. the supporting rings 18 are avoided.

Further, the cap 9 carries a cruciform member 20 which, at the lower end of the same is in magnetic contact with the pole shoe 12 at 21 and which extends axially towards the inlet opening 14. Consequently, this member 20 forms a secondary pole shoe in continuation of the pole shoe 12 and also forms a projection into the leakage flux between the magnet poles proper, so that the leakage flux will have a radially extending component and thereby provide a more effective influence on particles of ferro-magnetic material all over the flow area.

As the member 8 is here fully enclosed by the sleeve 3' with the cap 9, it is possible to provide the same with one or more axial windows, not shown, extending into the pole shoe 12, so that the space outside of the magnet 10 may be cleansed without a total dismounting of the apparatus, a dismounting which would involve a weakening of the magnet.

I claim:

1. Apparatus for the magnetic treatment of a flowing fluid, comprising:
   a flow-through housing including an inlet, a removable dependent cup-shaped part defining a chamber in fluid communication therewith, and an outlet in fluid communication with said chamber;
   at least one annular cylindrically shaped magnet axially arranged within said cup-shaped part and with its lower end spaced above the bottom thereof;
   a ferromagnetic tubular-shaped member inserted within said cup-shaped part along the walls thereof;
   a first disc-shaped magnetic pole piece with a central opening therethrough arranged with its peripheral edge spaced away from said tubular member and with its central opening arranged to direct fluid axially and interiorly of said annular magnet;
   a second disc-shaped magnetic pole piece with a central opening and located within said cup-shaped part above the bottom thereof and the peripheral edge of said pole piece in magnetic connection with the walls of said cup-shaped part; and
   apertures located in said second pole piece adjacent the walls of said tubular member whereby fluid is conducted from said inlet to the interior of said cylindrical magnet through the central opening of said first pole piece to the space defined above the bottom of the cup-shaped part by the location of the lower end of said magnet thereabove and upwardly therefrom through said second pole piece apertures past the peripheral edge of said first pole piece to the outlet in said housing.

2. An apparatus as in claim 1, wherein said annular cylindrical magnet is mounted with its longitudinal axis substantially transverse to the axis formed by said liquid inlet and outlet, the bottom of said cup shaped house part being in the form of a removable cap.

3. An apparatus as in claim 1, wherein the longitudinal axial length of said annular cylindrical magnet is small relative to the exterior diameter thereof.

4. An apparatus as in claim 1, further comprising a sieve inserted between said annular cylindrical magnet and said cup shaped part thereof.

5. Apparatus for the magnetic treatment of a flowing fluid, comprising:
   a flow-through housing including an inlet,
   a removable dependent cup-shaped part defining a chamber in fluid communication therewith, and an outlet in fluid communication with said chamber;
   at least one annular cylindrically shaped magnet axially arranged within said cup-shaped part;
   a ferromagnetic tubular shaped member inserted within said cup-shaped part along the walls thereof and resting on the bottom thereof;
   a first disc-shaped magnetic pole piece with a central opening therethrough arranged with its peripheral edges spaced away from said tubular member and with its central opening arranged to direct fluid axially and interiorly of said annular magnet;
   a second disc-shaped magnetic pole piece located within said cup-shaped part on the bottom thereof and the peripheral edge of said pole piece in magnetic connection with the walls of said tubular member; and said annular magnet further including passages from the interior cavity thereof to the space surrounding said magnet whereby fluid is conducted from said inlet to the interior of said cylindrical magnet through the central opening of said first pole piece and through said passages to the space surrounding the magnet and upwardly therefrom through the gap formed between said first pole piece and the walls of said tubular member to the outlet in said housing.

6. An apparatus as in claim 5, further comprising a ferro-magnetic member mounted within the cavity of said annular cylindrical magnet and in magnetically conductive connection with the same adjacent to the outlet from the magnet interior space, said ferro-magnetic member extending towards the inlet to the cavity.

7. An apparatus as in claim 5, further comprising a cylindrical sieve inserted in the cavity of said annular cylindrical magnet for covering the outlet thereof.

* * * * *